Nov. 27, 1945.  L. BURGERSTEIN  2,389,953
DRUM BRAKE FOR USE IN GENERAL ENGINEERING
Filed July 28, 1942
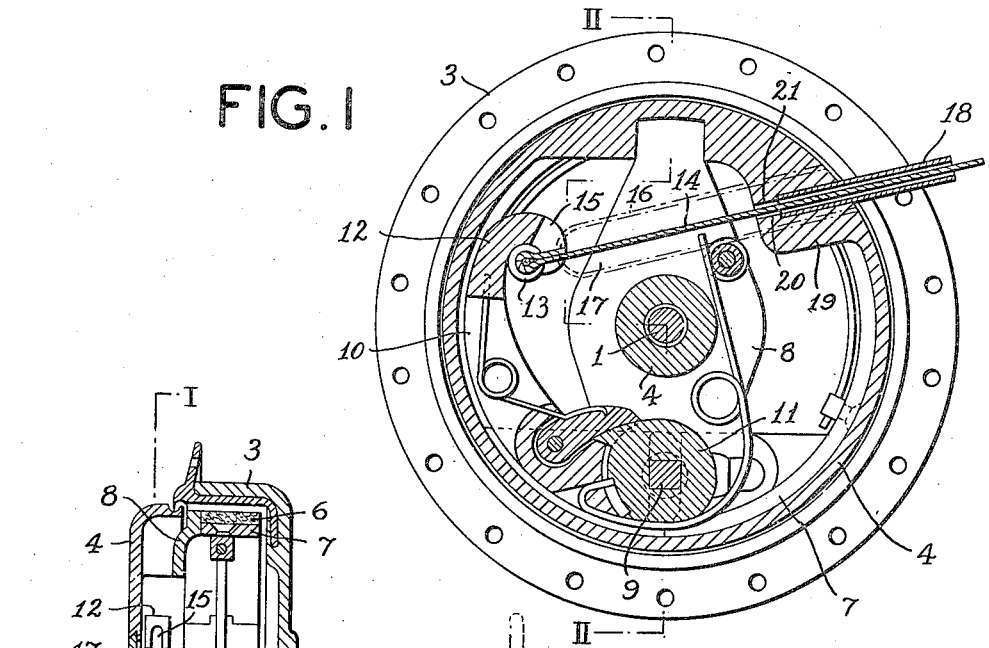
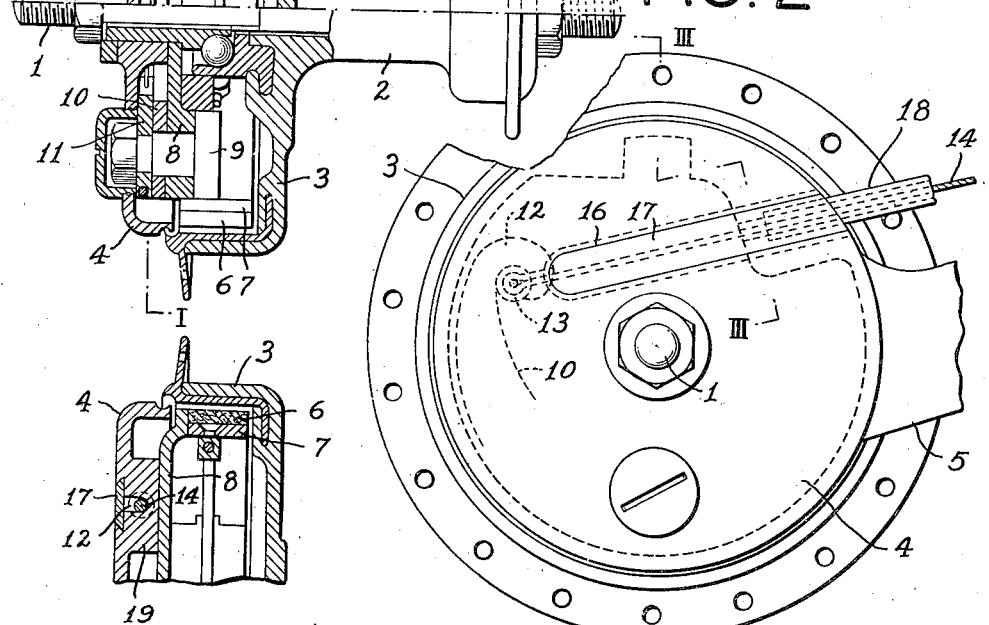
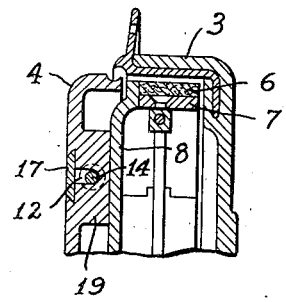
INVENTOR
Lothar Burgerstein,
BY
Munn Liddy & Glaccum
ATTORNEYS Patented Nov. 27, 1945

2,389,953

UNITED STATES PATENT OFFICE 2,389,953

DRUM BRAKE FOR USE IN GENERAL ENGINEERING

Lothar Burgerstein, Rapperswil, Switzerland

Application July 28, 1942, Serial No. 452,574

2 Claims. (Cl. 188—78)

The present invention relates to a drum brake for use in general engineering as well as for aircraft, motor cars, motor cycles and ordinary bicycles, comprising a brake ring member arranged within the drum and expansible against the action of a spring by means of a brake cam and a brake arm provided inside the brake drum.

Drum brakes of the kind with which the brake arm is fitted inside the drum and actuated by tension cable do not present a novelty. These well-known brake drums, however, suffer from the disadvantage that repair work to the wheel or the brake is difficult to execute as, when dismounting the wheel provided with the brake, because the tension cable is not detachably connected with the brake.

The primary object of the present invention is to obviate this drawback. For this purpose a tension cable is detachably arranged inside the drum at the free end of the brake arm, a closable aperture being thereby provided in the rigidly mounted lid of the drum through which the tension cable can be removed after having been detached from its connection with the brake arm.

The annexed drawing and the following description set forth in detail certain mechanism embodying the invention, such disclosed means constituting, however, but one form of various mechanical forms in which the principle of the invention may be used.

To the drawing:

Fig. 1 is a cross-section taken through the brake on the line I—I of Fig. 2,

Fig. 2 shows a fragmentary section taken on the line II—II of Fig. 1,

Fig. 3 is a detail section taken on the line III—III of Fig. 4 and

Fig. 4 an end view of the brake seen in the direction of the arrow IV indicated in Fig. 2.

In the present form of embodiment numeral 1 designates the axis, 2 the hub with the drum 3 of a cycle drum brake, 4 is a lid for closing the drum brake provided with cantilever 5 cast thereon which is attached to the cycle frame in the usual way being intended for taking up the brake reaction. Inside the drum 3 a brake ring member 7 is arranged with brake lining 6 and under action of a spring, against which said ring member can be expanded by means of a pivoting brake cam 9 in bearing bracket 8.

Inside the drum 3 between the front side of the lid 4 and the bearing bracket 8 a brake arm 10 is arranged which is borne on the shaft of the brake cam 9 and cooperatively connected to the latter by means of a locking disc 11. The free end of the brake arm 10 is bent towards the interior of the drum to form an open hook. In this hook 12 a pin 13 is pivotally supported on which the core 14 of a tension cable is attached. The curved end of the hook 12 has a slot 15 lying in the rocking plane of the brake arm 10 to afford passage of the cable core 14. In the front side of the drum lid 4 a slot 16 is provided running in the direction of cable core 14 which is of dovetail cross section and being closable by means of a slide 17. Numeral 18 designates the sheath of the cable core which penetrates the cast-on flap 19 of the stationary drum lid 4 leaning with the one front sided end against a shoulder 20 of flap 19 being thereby secured against axial displacement in the bore of the flap. For the passage of the cable core 14 through the shoulder 20 an opening 21 is provided which is open on the side turned towards the slide 17, i. e. communicating with slot 16.

With the improved brake according to the invention the wheel fitted with the brake can be removed of itself while the tension cable remains on the cycle frame.

For this purpose the slide 17 is first of all drawn out from the drum lid 4 and upon detensioning of the cable the pin 13 secured to the cable core must be removed out of the hook 12 of the brake arm 10. Afterwards the sheath of the cable 18 is drawn out from the bore of the flap 19, whereupon the cable core 14 can be removed laterally through the slits or slit 21 and 16, thus completely detaching the tension cable from the brake. When the cable has again to be connected to the brake the described manipulations are repeated in the reverse order.

It will be understood that the embodiment hereinbefore described has been given only by way of example and that the details thereof may be modified without departing beyond the scope of the invention and set forth in the appended claims.

What I claim is:

1. In a brake, a rotatable drum, a stationary cover for the drum, brake means operable to cooperate with the drum and including a lever within the drum, a tension cable having one end detachably connected with said lever, said cover having an opening therein extending from a point in proximity to where the cable is connected with said lever outwardly through the edge of the cover, and a closure member for the opening in the cover and removably engageable therewith, said closure member when removed enabling the detachment of the cable from said lever.

2. In a brake as set forth in claim 1, a sheath for said cable, and means on the inside of said cover with which the inner end of said sheath is frictionally engaged in line with said opening.

LOTHAR BURGERSTEIN.